(12) United States Patent
Sampson et al.

(10) Patent No.: US 11,168,005 B2
(45) Date of Patent: Nov. 9, 2021

(54) CONDUCTIVITY CONTROL OF AQUEOUS CHEMICAL DOSING IN WATER TREATMENT SYSTEMS

(71) Applicant: DRIPPING WET WATER, INC., San Antonio, TX (US)

(72) Inventors: Richard Sampson, San Antonio, TX (US); Allison Sampson, San Antonio, TX (US); James Andrew Mialkowski, San Antonio, TX (US); Mauricio Mata Nieto, San Antonio, TX (US)

(73) Assignee: DRIPPING WET WATER, INC, San Antonio, TX (US)

( * ) Notice: Subject to any disclaimer, the term of this patent is extended or adjusted under 35 U.S.C. 154(b) by 0 days.

(21) Appl. No.: 16/791,611

(22) Filed: Feb. 14, 2020

(65) Prior Publication Data
US 2020/0262717 A1      Aug. 20, 2020

Related U.S. Application Data

(60) Provisional application No. 62/807,559, filed on Feb. 19, 2019.

(51) Int. Cl.
*C02F 1/50* (2006.01)
*C02F 1/68* (2006.01)
(Continued)

(52) U.S. Cl.
CPC ............ *C02F 1/008* (2013.01); *C01B 11/022* (2013.01); *C02F 1/50* (2013.01); *C02F 1/686* (2013.01);
(Continued)

(58) Field of Classification Search
CPC .. C02F 1/008; C02F 1/686; C02F 1/50; C02F 2303/04; C02F 2209/05; C02F 2209/40;
(Continued)

(56) References Cited

U.S. PATENT DOCUMENTS

| | | |
|---|---|---|
| 3,619,110 A | 11/1971 | Borezee |
| 3,619,650 A | 11/1971 | Marchfelder |

(Continued)

FOREIGN PATENT DOCUMENTS

| | | |
|---|---|---|
| EP | 0365501 | 4/1990 |
| EP | 2502541 | 9/2012 |
| GB | 791680 | 3/1958 |

OTHER PUBLICATIONS

Grant et al. Grant & Hackh's Chemical Dictionary, $5^{th}$ Edition, 1987, p. 118.

(Continued)

*Primary Examiner* — Joseph W Drodge
(74) *Attorney, Agent, or Firm* — Jacobson Holman PLLC

(57) ABSTRACT

A method and apparatus use conductivity to control the dosing of various chemical additives used in the water treatment industry by modulating the chemical additives within threshold setpoints. Conductivity directly correlates to concentration of chemical additives. This correlation is used to modulate the dosing rates of chemical additives into a process water stream to consistently regulate and balance chemical additive concentration within the process water stream. For example, the method and apparatus dose chlorine dioxide precursor solutions into a process water stream to generate a consistent concentration of aqueous chlorine dioxide.

15 Claims, 7 Drawing Sheets

(51) Int. Cl.
*C02F 1/76* (2006.01)
*C02F 1/00* (2006.01)
*C01B 11/02* (2006.01)

(52) U.S. Cl.
CPC ............ *C02F 1/76* (2013.01); *C02F 2209/05* (2013.01); *C02F 2209/40* (2013.01); *C02F 2303/04* (2013.01)

(58) Field of Classification Search
CPC .. C02F 2303/22; C02F 1/66; C02F 2103/023; C02F 1/76; C02F 1/05; C02F 1/685; C01B 11/022; C01B 11/024; C01B 11/023; B01F 15/00136; B01F 15/00142; B01F 15/00149; B01F 15/00227; B01F 15/00253; B01F 15/00279; B01F 15/00285; B01F 15/00292
USPC ........ 210/739, 748.2, 754, 755, 96.1, 198.1, 210/205, 206; 366/151.1, 152.1, 152.2, 366/152.4, 177.1; 137/3, 5, 9, 93
See application file for complete search history.

(56) References Cited

U.S. PATENT DOCUMENTS

| | | | |
|---|---|---|---|
| 3,684,437 | A | 8/1972 | Callerame |
| 3,828,097 | A | 8/1974 | Callerame |
| 3,857,737 | A | 12/1974 | Kemp et al. |
| 3,936,502 | A | 2/1976 | Barber |
| 4,006,095 | A | 2/1977 | Hoffman et al. |
| 4,269,619 | A | 5/1981 | Bilofsky |
| 4,504,442 | A | 3/1985 | Rosenblatt et al. |
| 4,648,043 | A * | 3/1987 | O'Leary ........... B01F 15/00227 137/93 |
| 4,659,459 | A * | 4/1987 | O'Leary ................. B01J 4/008 210/143 |
| 4,662,747 | A | 5/1987 | Isaacson |
| 4,681,739 | A | 7/1987 | Rosenblatt et al. |
| 4,880,711 | A | 11/1989 | Luczak et al. |
| 4,925,645 | A | 5/1990 | Mason |
| 5,008,096 | A | 4/1991 | Ringo |
| 5,059,406 | A | 10/1991 | Sheth et al. |
| 5,078,908 | A | 1/1992 | Ripley et al. |
| 5,100,652 | A | 3/1992 | Kross et al. |
| 5,116,620 | A | 5/1992 | Chvapil et al. |
| 5,122,285 | A | 6/1992 | Mason |
| 5,185,161 | A | 2/1993 | Davidson |
| 5,324,477 | A | 6/1994 | Schroder |
| 5,342,510 | A * | 8/1994 | Eden .................... B01J 19/0006 204/433 |
| 5,391,533 | A | 2/1995 | Peterson et al. |
| 5,435,984 | A | 7/1995 | Daly et al. |
| 5,639,436 | A | 6/1997 | Benson |
| 5,651,996 | A | 7/1997 | Roozdar |
| 5,820,822 | A | 10/1998 | Kross |
| RE36,064 | E | 1/1999 | Davidson et al. |
| 5,960,808 | A * | 10/1999 | Ferguson .................. A61L 2/18 137/5 |
| 6,024,850 | A | 2/2000 | Sampson et al. |
| 6,063,425 | A | 5/2000 | Kross et al. |
| 6,077,495 | A | 6/2000 | Speronello et al. |
| 6,123,966 | A | 9/2000 | Kross |
| 6,200,557 | B1 | 3/2001 | Ratcliff |
| 6,238,643 | B1 | 5/2001 | Thangaraj et al. |
| 6,265,343 | B1 | 7/2001 | Daly et al. |
| 6,287,533 | B1 | 9/2001 | Khan et al. |
| 2001/0001655 | A1 | 5/2001 | Kuke |
| 2002/0037248 | A1 | 3/2002 | Bechberger |
| 2004/0071627 | A1 | 4/2004 | DiMascio |
| 2004/0211731 | A1 * | 10/2004 | Ferguson ................ C02F 1/008 210/739 |
| 2005/0079230 | A1 | 4/2005 | Lee |
| 2005/0084411 | A1 * | 4/2005 | Childers, II .............. C02F 1/76 422/3 |
| 2005/0222287 | A1 | 10/2005 | Roberts |
| 2006/0096930 | A1 * | 5/2006 | Beardwood ............. C02F 1/008 210/743 |
| 2011/0129388 | A1 * | 6/2011 | Alarid ................... C01B 11/024 422/37 |
| 2011/0132815 | A1 * | 6/2011 | Angelilli ................... C02F 1/76 210/88 |
| 2011/0250123 | A1 | 10/2011 | Sampson et al. |
| 2012/0183469 | A1 | 7/2012 | Mussari |
| 2015/0125382 | A1 * | 5/2015 | Kuke .................... C01B 11/024 423/477 |
| 2015/0218022 | A1 * | 8/2015 | Doak ........................ C02F 1/76 210/704 |
| 2016/0376166 | A1 * | 12/2016 | Lawryshyn ............... C02F 1/32 210/709 |
| 2017/0008784 | A1 | 1/2017 | Shimpo et al. |
| 2017/0349436 | A1 * | 12/2017 | Alvarado .............. C01B 11/026 |
| 2018/0001262 | A1 | 1/2018 | Rao et al. |
| 2018/0179058 | A1 * | 6/2018 | von Rege ............. C01B 11/024 |

OTHER PUBLICATIONS

White, Geo Clifford, Handbook of Chlorination and Alternative Disinfectants, 4th Edition, 1999, pp. 1153-1202.
Gordon et al. The Chemistry of Chlorine Dioxide, Progress in Inorganic Chemistry, vol. 15, 1972, pp. 201-286.
Helfferich, Ion Exchange, 1995, pp. 519-550.
Duolite Ion-Exchange Manual, Chemical Process Company, 1960.
McPeak et al. Iron in Water and Processes for its Removal, 21st Annual Liberty Bell Corrosion Course, 1983.
Manganese Greensand CR & IR, Iversand Company; 1998.
Masschelein, Chlorine Dioxide, Chemistry and Environmental Impact of Oxychlorine Compounds, Ann Arbor Science Publishers, Inc. 1979.
XP-002227957; JP 6271301; Suido Kiko Co. Ltd; 1994, abstract.
Aieta et al. Determination of chlorine dioxide, chlorine chlorie and chlorate in water, American Water Works Associate, Journal, vol. 76, No. 1, 1984, pp. 64-70.
National Exposure Research Laboratory, U.S. Environmental Protection Agency: Method 300.1, Determination of inorganic anions in drinking water by ion chromatography, 1999, pp. 300.1-1-300. 1-39.
Vogt, Helmut et al. Chlorine Oxides and Chlorine Oxygen Acids, 5. Chlorine Dioxide. Ullmann's Encyclopedia of Industrial Chemistry, vol. 8, Apr. 14, 2010, pp. 637-652.
Lentech, Disinfectants Chlorine Dioxide, 2009, pp. 1-5 taken from https://web.archive.org/web/20090922222758/http://www/lenntech. com/processes/disinfection/chemical/disinfectants-chlorine-dioxide. htm.
Gates, Don, PhD, The Chlorine Dioxide Handbook, Water Disinfection Series, AWWA, 1998.
Lewatit, Bayer AG, Catalytic Removal fo Dissolved Oxygen from Water.
Dence et al. Pulp Bleaching Principles and Practice, Tappi Press, 1996.
Simpson et al. A Focus on Chlorine Dioxide: The "Ideal" Biocide. Encyclopedia.com, Mechanism of Catalysis.

* cited by examiner

CONDUCTIVITY CONTROL OF AQUEOUS CHEMICAL DOSING IN WATER TREATMENT SYSTEMS

FIELD OF THE INVENTION

The present invention relates to controlling the rates of chemical additives dosed in process water in the water treatment industry. In particular, the invention relates to controlling the dosing rates and to the resulting concentration of the diluted chemical additives in the process water.

BACKGROUND OF THE INVENTION

Cases of dosing chemical additives within threshold limits are well known in the water treatment industry. The threshold dosing method is an on/off method of dosing. There can be one or more threshold setpoints, depending upon the number of chemical additives to be introduced into the water stream. When one threshold setpoint is reached, the dosing will begin. When another threshold setpoint is reached, the dosing will cease. The dosing rate of the chemical additives is constant between setpoints in this dosing method. The limitation of this method is the concentration variability of the chemical additives between the threshold setpoints. Threshold dosing is designed to deliver chemical additives as a batch without concern of the concentration of the chemical additive in the water treatment system. As the dosing begins at the starting setpoint, chemical additive is dosed until the ending setpoint is reached. The concentration of chemical additive is low when the chemical additive is first introduced into the water system, and the concentration of chemical additive increases until the ending setpoint triggers the cessation of dosing. The concentration of chemical additive in the water treatment system decreases after the ending setpoint triggers dosing to stop until the starting setpoint triggers dosing to begin again. Threshold dosing is, therefore, cyclical by design, which limits consistency of concentration in water treatment systems. Threshold setpoints are triggered by measuring devices such as flow switches, timers, level switches, oxidation-reduction potential (ORP) sensors and other such measuring devices.

One case of threshold dosing chemical additives is the dosing of chlorine and acid into cooling towers. In this case, a low-level ORP reading triggers chlorine, in the form of bleach (sodium hypochlorite), to begin chlorine dosing into a water line until a high-level ORP reading is achieved, at which time chlorine dosing ceases. Next, a high-level pH reading triggers acid to be dosed into the same water line until a low-level pH reading is achieved, at which time dosing ceases. Both the chlorine and acid concentrations rise while being dosed and fall when dosing ceases. The cyclical dosing of the threshold dosing method limits the ability to consistently regulate and balance chemical additive concentrations in the water treatment industry.

In another case of threshold dosing in the water treatment industry, the precursor solutions in the generation of aqueous chlorine dioxide, as well as the aqueous chlorine dioxide itself, are dosed in a threshold manner. Chlorine dioxide poses a unique challenge to the water treatment industry because aqueous chlorine dioxide solutions are typically unstable and therefore are generated onsite, unlike traditional chemical additives which are made elsewhere and merely injected onsite. The generator of chlorine dioxide requires that a chemical reaction occur. Varying pH and precursor concentrations dramatically affect the reaction efficiency of the resulting aqueous chlorine dioxide solution.

In this case of threshold dosing, a low-level sodium chlorite setting on a level switch triggers an aqueous sodium chlorite solution to be dosed into a vessel until a high-level sodium chlorite setting on the level switch is reached. The high-level sodium chlorite setting then triggers the dosing of an aqueous acid solution to be dosed into the vessel until the high-level acid setting on another level switch is reached. Both the sodium chlorite and acid concentrations rise while being dosed and fall when dosing ceases. The cyclical dosing of the threshold dosing method limits the ability to consistently regulate and balance chlorine dioxide precursor concentrations. The limited ability to regulate the concentrations of the chlorine dioxide precursor solutions results in the inefficient and inconsistent production of aqueous chlorine dioxide.

In addition to threshold dosing, modulated dosing is another dosing method used in the water treatment industry. Modulated dosing is a proportional method of dosing. Modulated dosing measures the flow of process water and doses the chemical additive proportionally to the flow of the process water. Modulated dosing more accurately controls the concentration of the chemical additive in the process water than does threshold dosing. Because process water flow changes are usually smooth and gradual, the concentration of chemical additives in the water treatment system creates a smooth oscillating wave function, but high and low concentrations continue to exist.

Threshold and modulated dosing methods are often combined by using proportional modulating dosing within threshold setpoints. The threshold setpoints are the lower and upper limits of the oscillating wave function produced by the modulated dosing method. The combination of threshold and modulated dosing results in a more consistent dosing method than either method alone, but even though the peaks and valleys of modulated dosing are limited by the threshold setpoints, they still exist.

One case of modulating dosing within threshold setpoints is the dosing of chlorine and acid into a water treatment system using the flow rate of process water to proportionally dose the chemical additives and ORP and pH sensors to set the threshold setpoints of the chlorine and acid, respectively. In this case of modulated dosing, the process water flow rate is measured by a flow meter. The chlorine is then dosed proportionally based on the process water flow rate at a predetermined dilution rate as the ORP setpoints regulate the low and high limits of the threshold dosing. Next, acid is dosed proportionally based on the process water flow rate at a predetermined dilution rate as the pH setpoints regulate the high and low limits of the threshold dosing. As the chemical additives are dosed, there is an oscillating wave function produced by the modulated dosing, but the wave is held within the threshold setpoints. This circumstance limits the ability to consistently regulate and balance chemical additive concentrations in the water treatment systems.

In addition, although chemical additive dosing rates can be proportional to process water flow and limited by threshold setpoints, concentration of the chemical additives in the process water flow cannot be directly correlated to process water flow because of the variability in both process water flow and chemical additive purity levels and concentrations. For example, it is well known that chlorine in the form of bleach degrades over time. As the concentration of the chlorine degrades, the modulate dosing rate remains proportional to the process water flow rate based on the original concentration of the bleach, resulting in a lower concentration of chlorine over time in the water treatment system.

SUMMARY OF THE INVENTION

In accordance with the present invention, it has been discovered that conductivity is useful as a control function for the dosing of chemical additives such as, e.g., sanitizing agents and sanitizing agent precursors, in water treatment systems. Aqueous solution conductivity, referred to in the water treatment industry as simply conductivity, is the measure of an aqueous solution's ability to conduct electricity. All aqueous solutions have a measurable conductivity directly proportional to the specific ions in the aqueous solution. Because conductivity relates to the ions in solution, there is a direct correlation between conductivity and concentration in aqueous solutions that does not exist with other standards used for control.

Since conductivity relates directly to concentration in aqueous solutions, it is used in the present invention as the baseline for modulated dosing control and threshold dosing control. Conductivity is used to control modulated dosing, because it gives instantaneous feedback to the pumps or other dosing apparatus just like a flowmeter does. Conductivity is used to control threshold dosing by setting the upper and lower threshold setpoints. In addition, conductivity controls modulated dosing and threshold dosing at the same time by controlling the instantaneous dosing like the flowmeter in modulated dosing and by, also, controlling the threshold setpoints, so that the peaks and troughs are contained. Essentially, concentration, in the form of conductivity, is used to control dosing, eliminating the variables in traditional water treatment dosing methods.

For example, in accordance with the present invention conductivity is used to control the dosing of precursor solutions in the generation of aqueous chlorine dioxide. By using conductivity to control the dosing of precursor solutions in the generation of aqueous chlorine dioxide, the aqueous chlorine dioxide concentration produced is consistently regulated and balanced.

In a preferred embodiment of the present invention, conductivity is used to determine an aqueous solution's concentration, and the determined concentration's conductivity is used to control the dosing of chemical additives into a water treatment system.

Therefore, in accordance with the present invention chemical additives are sequentially dosed (diluted) into a stream of process water in a water treatment system. The conductivity of the diluted chemical additives is a known parameter. The conductivities of the process water, initially, and the water stream after dosing each additive are measured. Each measured conductivity is subtracted from the next-measured conductivity to determine the conductivity of the additive dosed between the two measurements. The determined conductivity of each dosed (diluted) chemical additive is compared to the known conductivity of each diluted chemical additive. The dosing rate of each additive is, then, modulated so that the determined conductivity of each diluted chemical additive in the water stream is matched to its known conductivity.

In addition, in accordance with the present invention chemical additives are separately dosed into separate process water streams, respectively, before then being combined into the final process water stream.

Further, in accordance with the present invention the chemical additives are dosed into a process water in any order.

Still further, in accordance with the present invention the chemical additives are one or more precursor solutions for the generation of aqueous chlorine dioxide in order to achieve a consistent concentration of aqueous chlorine dioxide.

FURTHER DESCRIPTION OF THE INVENTION

Figure 1:
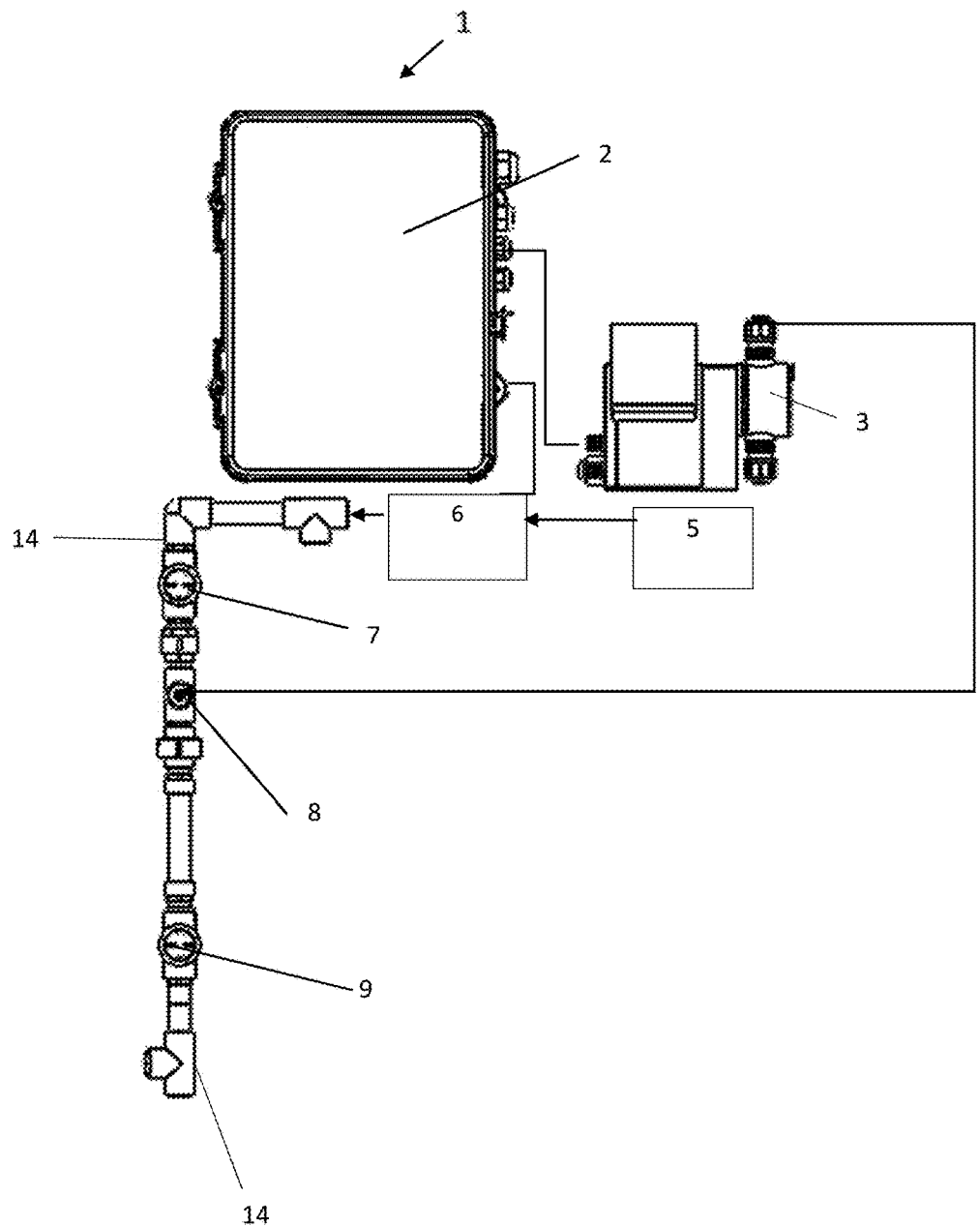
FIG. 1 is a schematic drawing of an apparatus for dosing a chemical additive, and measuring its conductivity.

In describing the present invention, specific terminology is used, and embodiments provided, for the sake of clarity. However, the invention is not necessarily limited to the specific terminology used, or to the specific embodiments disclosed.

As used herein, the following terms shall have the meanings stated. The term "solution" means a mixture formed by a process by which a solid, liquid, or gaseous substance is mixed with a liquid, whether that liquid is a droplet, aerosol, vapor, or mist. The term "chemical additive" is used to mean any solution or combination of solutions used in the water treatment industry such as, e.g., sanitizing agents and their precursors. The term "modulate" is used to mean the continuous adjustment of the dosing of chemical additive(s), such as, e.g., chlorine dioxide precursor solution(s), to keep them in proper measure or proportion. The term "known conductivity" is used to mean the conductivity that corresponds to the concentration of one or more chemical additives in the solution. The term "sequential" is used to mean the dosing of chemical additives, such as, e.g., chlorine dioxide precursor solutions, one after another in the same dilution water source or water system. The term "separate" is used to mean the dosing of chemical additives, such as, e.g., chlorine dioxide precursor solutions, independently of each other in independent dilution water sources or water systems. The term "precursor solution" is used to mean any solution or combination of solutions used to generate a product such as, e.g., chlorine dioxide. The term "water treatment system" is used to mean any system or conduit containing water that requires modification by chemical or mechanical means. The term "process water" is used to mean any inlet water, recycled water, and/or discharge water found in any residential, commercial, or industrial application. The term "flow regulator" is used to mean a device that controls/adjusts the flow rate (linear, nonlinear, mass or volumetric) of a liquid there through, such as, e.g., a valve, a pump, an eductor, and the like. The term "flow meter" is used to mean an instrument that measures/monitors the flow rate (linear, nonlinear, mass or volumetric) of a liquid there through. There are various types of, and different names for, flow meters, such as, e.g., a rotameter (variable area flow meter), a spring and piston flow meter, a turbine flow meter, a paddlewheel sensors, a positive displacement flow meter, a vortex meter, and the like.

There are many controllers that can be used within the scope of the present invention. These include but are not limited to microprocessors and programmable logic controllers (PLCs). Controlling methods must provide feedback to modulate the dosing rates of the chemical additives, and it is within the scope of those skilled in the art to select an appropriate controller for modulating the dosing of chemical additives to a water treatment system.

In one form of the present invention, conductivity is used to determine an aqueous solution's concentration, and the determined concentration's conductivity is used to control the dosing of chemical additives into a water treatment system by modulating the chemical additives into the water treatment system within threshold limits, which are also controlled by conductivity.

In another form of the present invention, chemical additives are sequentially dosed into a water treatment system. The conductivities of the process water and the water stream after adding each chemical additive is determined. Each conductivity is subtracted from the conductivity after it to determine the conductivity of the individual diluted additive. Each determined conductivity is compared to the known conductivity of each diluted chemical additive. The dosing rate of each chemical additive is modulated to achieve a determined conductivity matching the known conductivity of the diluted chemical additive.

In another form of the present invention, the chemical additives are dosed separately into independent sources of process water. The conductivities are measured of the independent water source and the water stream after each of the chemical additives has been added. Each conductivity is subtracted from the next measured conductivity to calculate the determined conductivity of each diluted chemical additive. The determined conductivities are then compared to the known conductivities of the diluted chemical additive solutions. The dosing rates of the solutions are modulated to achieve the known conductivities of each diluted chemical additive solution. These modulated diluted chemical additive solutions result in consistent concentrations of diluted chemical additive in the final water system.

In yet another form of the present invention, conductivity is used to determine the concentration of chlorine dioxide precursor solutions, and the determined chlorine dioxide precursor solution's concentration's conductivity is used to modulate the dosing of and set threshold limits for the chlorine dioxide precursor solutions for the generation of aqueous chlorine dioxide.

Figure 2:
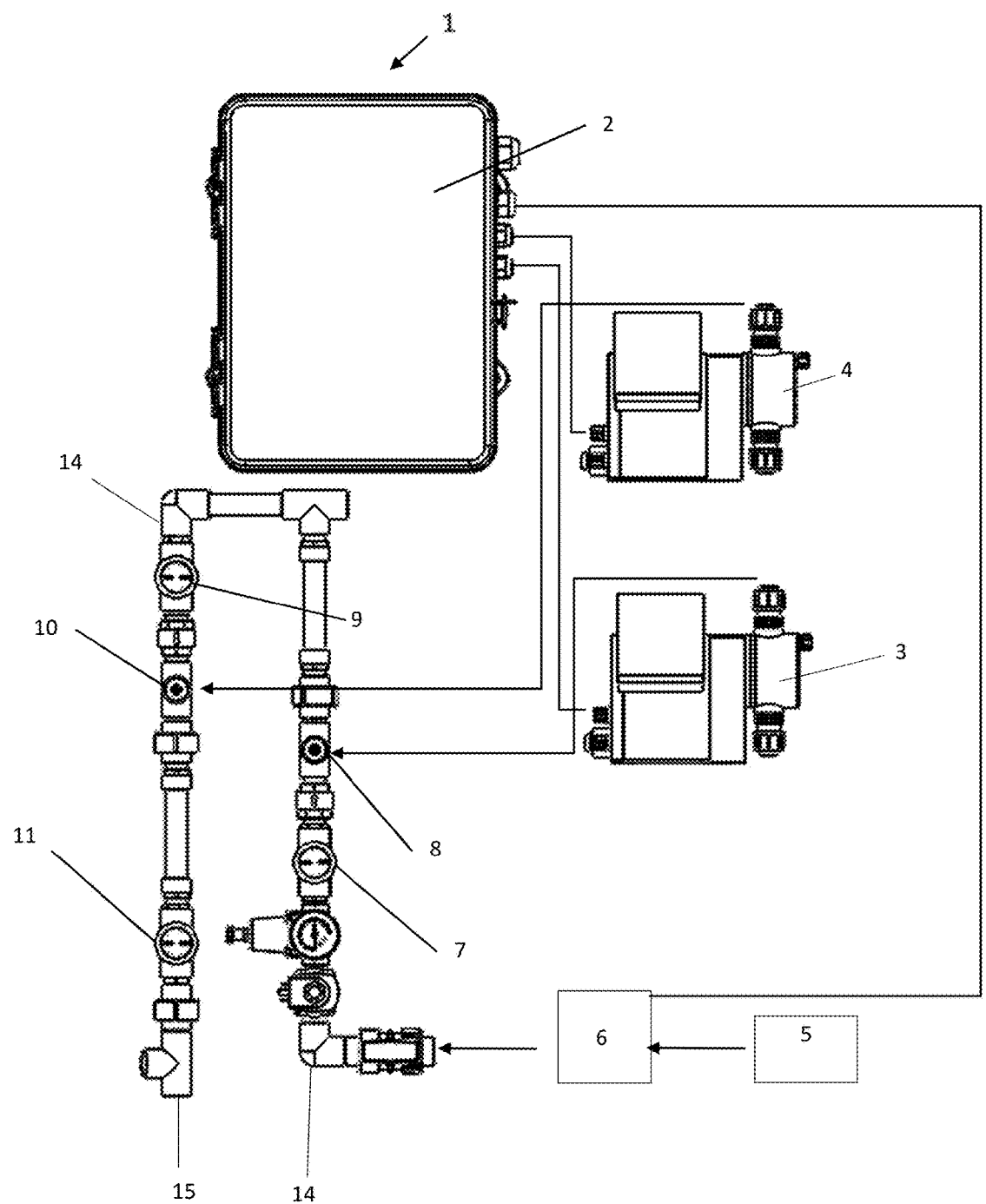
FIG. 2 is a schematic drawing of an apparatus for sequentially (serially) dosing chemical additives, and sequentially measuring conductivities.

In a further embodiment an apparatus of the instant invention is illustrated in FIG. 2. FIG. 2 shows apparatus (1) fed with a single source of dilution water (5). This system uses three conductivity probes (7, 9, 11), two dosing pumps (3, 4), two injection points (8, 10), a flow meter (6), and a controller (2). The first dosing pump (3) is used to inject the first chemical additive into the dilution water flowing (streaming) through conduit (14) at first injection point (8), and the second dosing pump (4) is used to inject a second chemical additive into the dilution water (already containing the first additive) flowing (streaming) through conduit (14) at second injection point (10). The first conductivity probe (7) is used to measure the dilution water conductivity. The second conductivity probe (9) is used to determine the diluted first chemical additive solution conductivity. The third conductivity probe (11) is used to determine the conductivity of the diluted second chemical additive solution. The mixed first and second diluted chemical additives solution passes out of the system through the outlet (15).

EXAMPLES

Example 1: Comparing Modulated Dosing—Flow Rate Versus Conductivity

Examples 1 A and 1B use concentrated sodium chlorite (25% active sodium chlorite). The known conductivity for sodium chlorite diluted to 1,250 mg/L is 1,500 µS, which known conductivity is used in Example 1B to modulate the dosing (dilution) rate of the sodium chlorite.

Examples 1A and 1B use the dosing system of FIG. 1. FIG. 1 shows dosing system (1) having conduit piping (14) fed with dilution water through a flow meter (6) from a single water source (5). This system uses first and second successive conductivity probes (7, 9), a chemical dosing pump (3), a chemical injection point (8) located between the conductivity probes and connected to the pump, and a controller (2). The dosing pump is used to inject a concentrated sodium chlorite solution into the dilution water flowing (streaming) through the conduit at the injection point. The first conductivity probe is used to measure the dilution water conductivity. The second probe is used to determine the conductivity of the water stream after introduction of the concentrated sodium chlorite solution. This results in inconsistent conductivities of the precursors, and inconsistent concentration of aqueous chlorine dioxide produced, over time.

Example 1A

Figure 6:
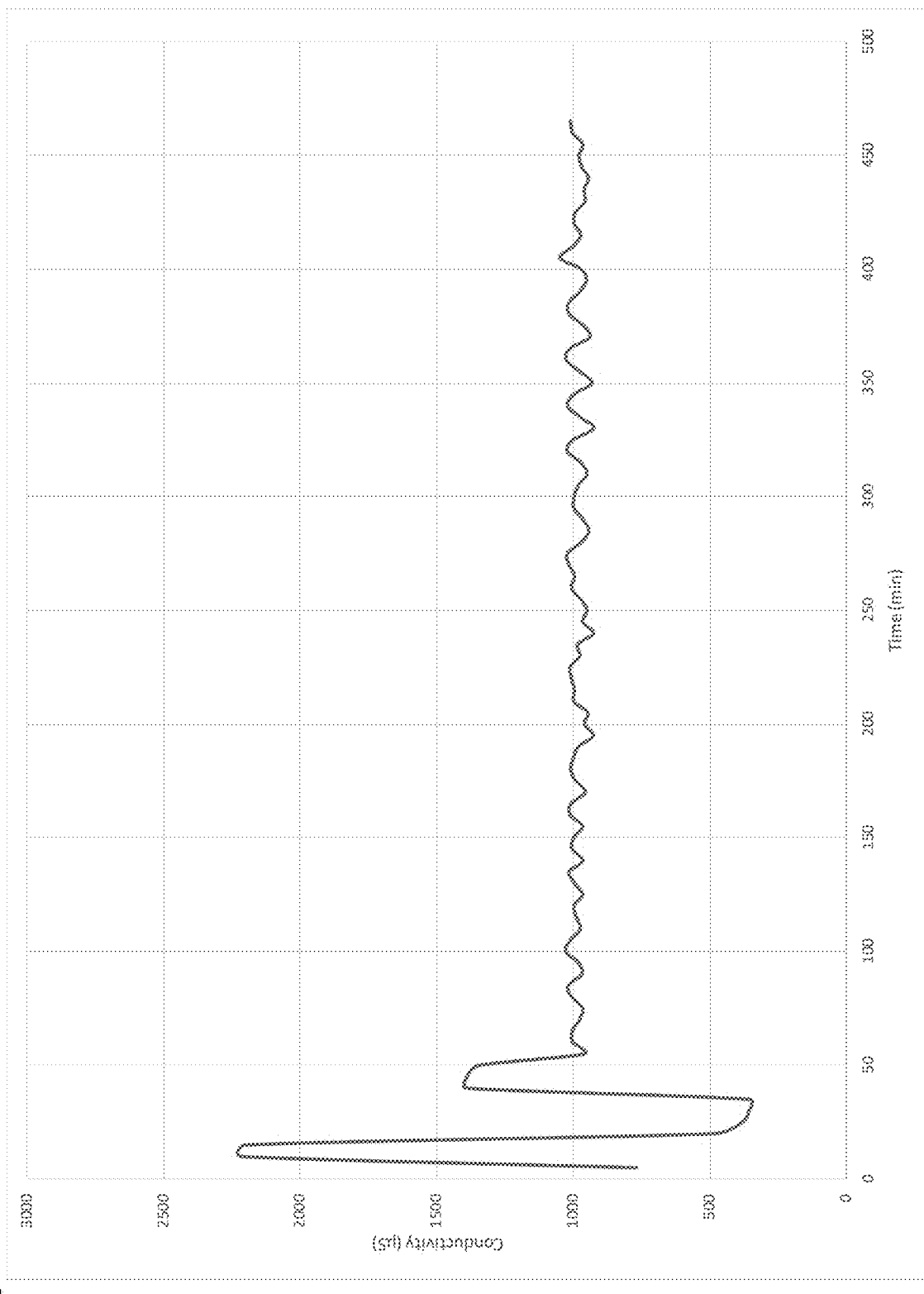
FIG. 6 is a graph of the results from Example 1A below.

In this example, the flow rate—as measured by the flow meter—is used to modulate the dilution (dosing) rate of the concentrated sodium chlorite solution, i.e., via the dosing pump, and the first and second conductivity probes are used for monitoring purposes. The flow rate of the dilution water through the system is 0.5 L/min. The solution of the dilution water containing the sodium chlorite additive is referred to as the diluted sodium chlorite solution. The flow rate is used to modulate the dilution rate of the sodium chlorite dosing pump. The first conductivity probe records the dilution water conductivity (P1), and the second conductivity probe records the conductivity of the diluted sodium chlorite solution, i.e., after the concentrated sodium chlorite solution is injected into the dilution water (P2). The first conductivity probe reading is subtracted from the second conductivity probe reading (P2-P1) to determine the conductivity of the diluted sodium chlorite solution. The conductivity of the diluted sodium chlorite solution is recorded and graphed in FIG. 6. Thus, as shown by the FIG. 6 graph, using flow rate modulation results in the diluted sodium chlorite solution conductivity represented by a relatively smooth oscillating wave, i.e., a relatively constant conductivity is obtained. However, flow rate modulation does not produce the desired 1500 µS conductivity—but a conductivity of about 1000 µS.

Example 1B

Figure 7:
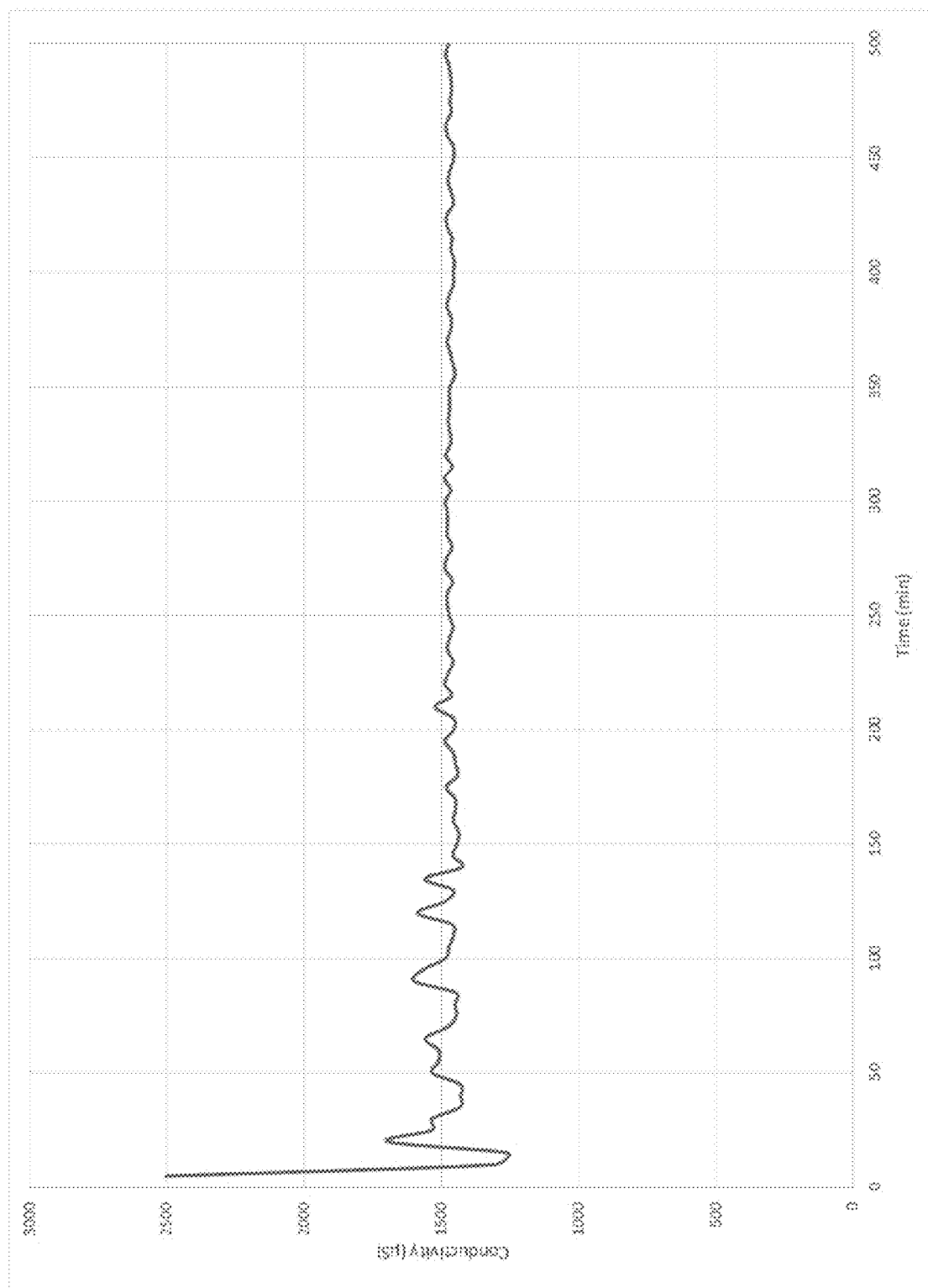
FIG. 7 is graph of the results from Example 1B below.

In this example, conductivities measured by the two conductivity probes are used to modulate the dilution (dosing) rate of the concentrated sodium chlorite solution, i.e., via the dosing pump, and the flow meter is used for monitoring purposes. The flow rate of the dilution water through the system is 0.5 L/min. The first conductivity probe records the dilution water conductivity (P1). The second conductivity probe records the conductivity of the diluted sodium chlorite solution, i.e., downstream of injecting the concentrated sodium chlorite solution into the dilution water. The first conductivity probe reading is subtracted from the second conductivity probe reading (P2-P1) to determine the conductivity of the diluted sodium chlorite solution. The determined conductivity of the diluted sodium chlorite solution (P2-P1) is compared to the desired, known conductivity of the diluted sodium chlorite solution. The dilution (dosing) rate of the concentrated sodium chlorite solution is then modulated so that the determined conductivity of the diluted sodium chlorite solution (P2-P1) matches the desired, known conductivity of the diluted sodium chlorite solution. The conductivity of the diluted sodium chlorite solution is recorded and graphed in FIG. 7. Thus, as shown by the FIG. 7 graph, using conductivity to control (modulate) the dosing rate of the concentrated sodium chloride solution results in a conductivity of the diluted sodium chlorite solution that is smooth and consistent, and the desired 1500 μS conductivity is achieved.

Example 2: Aqueous Chlorine Dioxide Generation Using Sequential Precursor Injection and Conductivity Modulated Dosing Examples 2A and 2B use 25% active sodium chlorite (concentrated sodium chlorite) and 35% (w/w) sulfuric acid (concentrated sulfuric acid) as the precursor chemicals. The known conductivity for sodium chlorite diluted to 1,250 mg/L is 1,500 μS, and the known conductivity for diluted sulfuric acid at a pH of 1.8 is 2,000 μS. These known conductivities are used in the following examples to modulate the dilution rate of the precursor chemicals to generate a concentration of aqueous chlorine dioxide.

Figure 3:
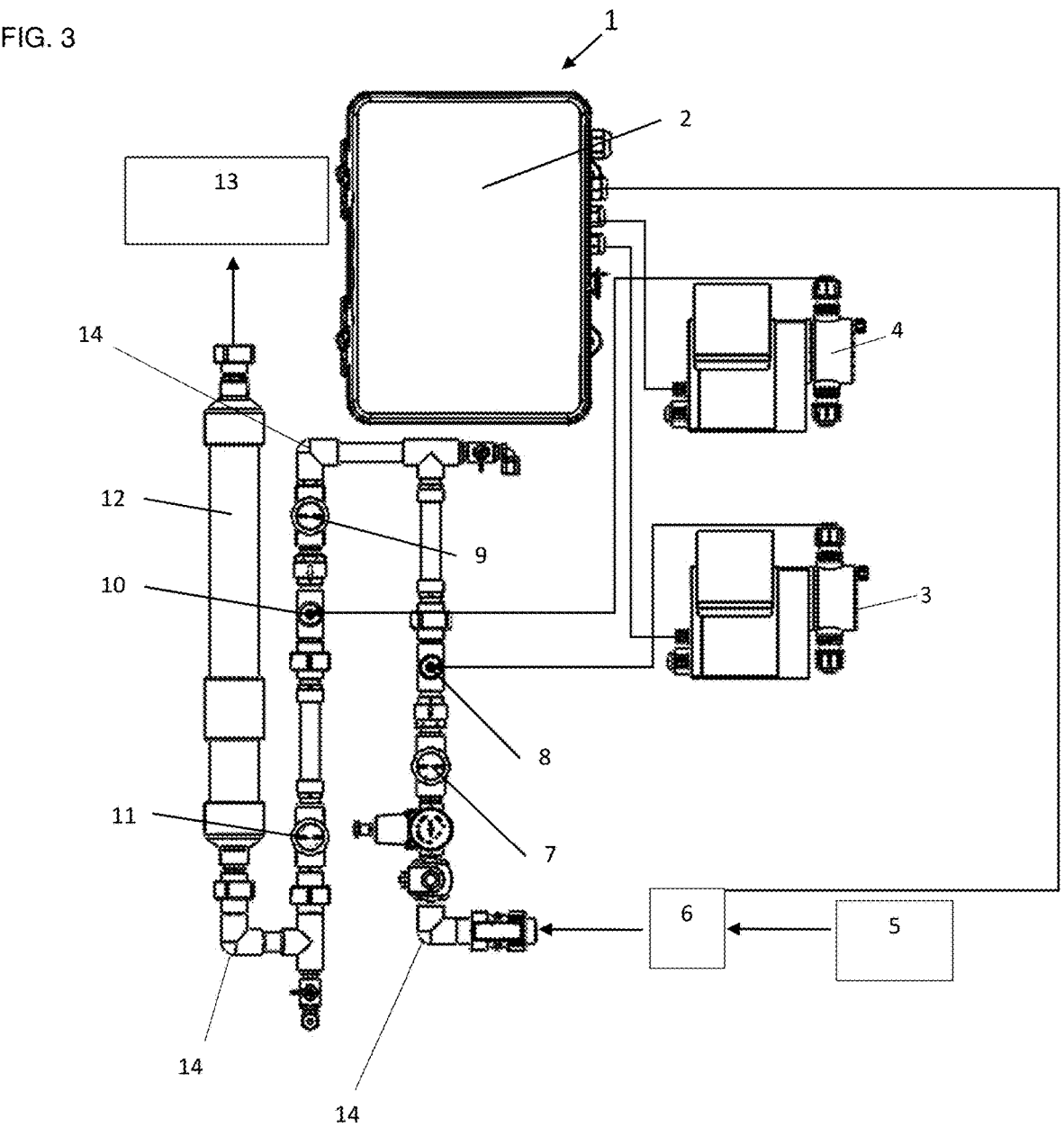
FIG. 3 is a schematic drawing of an apparatus for sequentially (serially) dosing chemical additives, and sequentially measuring conductivities, e.g., for generating aqueous chlorine dioxide, in accordance with the invention described in this application.
Figure 4:
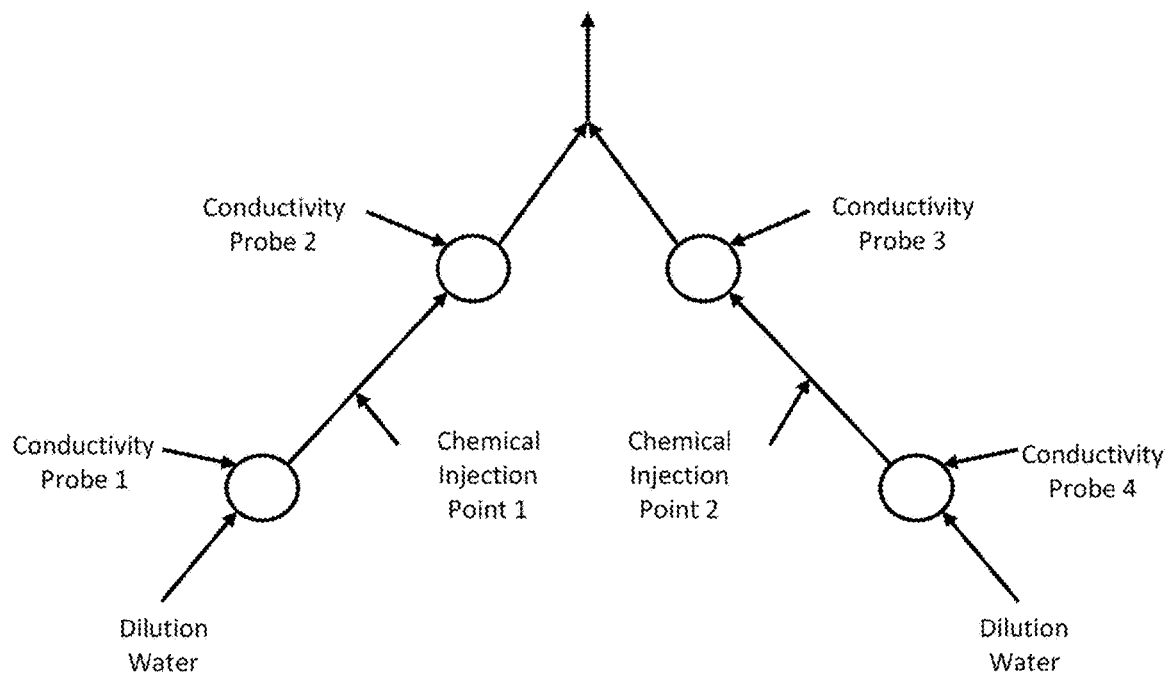
FIG. 4 is a flow diagram of a method for parallel dosing of chemical additives, and parallel measuring of conductivities, sequentially, in accordance with the invention described in this application.

Examples 2A and 2B use the serial dosing system of FIG. 3. FIG. 3 shows an aqueous chlorine dioxide generation system (1) fed with a single source of dilution water (5). This system uses three conductivity probes (7, 9, 11), two dosing pumps (3, 4), two injection points (8, 10), a flow meter (6), and a controller (2). The first dosing pump (3) is used to inject the concentrated sodium chlorite into the dilution water flowing (streaming) through conduit (14) at first injection point (8), and the second dosing pump (4) is used to inject the concentrated sulfuric acid into the dilution water (already containing sodium chlorite) flowing (streaming) through conduit (14) at second injection point (10). The first conductivity probe (7) is used to measure the dilution water conductivity. The second conductivity probe (9) is used to determine the diluted sodium chlorite solution conductivity. The third conductivity probe (11) is used to determine the conductivity of the diluted sulfuric acid solution. The aqueous chlorine dioxide concentration is measured using a Hach 2700 Spectrophotometer.

Example 2A

In this example, the flow rate—as measured by the flow meter (6)—is used to modulate the dilution rate of the concentrated sodium chlorite solution and concentrated sulfuric acid solution, i.e., via first and second dosing pumps (3, 4), respectively, and the conductivity probes are used for monitoring purposes. The flow rate of the dilution water through the system is 0.5 L/min. The first conductivity probe (7) records the dilution water conductivity, the second conductivity probe (9) records the conductivity downstream of injecting the concentrated sodium chlorite solution into the dilution water, the third conductivity probe (11) records the conductivity downstream of injecting the concentrated sulfuric acid solution into the dilution water containing the sodium chlorite, and the dilution water containing the sodium chlorite and sulfuric acid downstream of the third conductivity probe (i.e., the diluted, sodium chlorite and sulfuric acid solution) is continuously fed through a catalyst to generate aqueous chlorine dioxide (13), the concentration of which is measured using the Hach 2700 Spectrophotometer, and recorded in Table 1. As shown in Table 1, the first conductivity probe reading subtracted from the second conductivity probe reading (P2-P1) determines the conductivity of the diluted sodium chlorite solution, the second conductivity probe reading subtracted from the third conductivity probe reading (P3-P2) determines the conductivity of the diluted sulfuric acid solution, and the Hach 2700 Spectrophotometer records the chlorine dioxide concentration in the aqueous chlorine dioxide downstream of the catalyst.

The values recorded in Table 1 show that using flow rate modulation and sequential precursor injection effects inconsistent conductivities in the diluted sodium chlorite solution (P2-P1) and the diluted sulfuric acid solution (P3-P2). The observed inconsistencies are due to the flow regulator's inability to provide sensitive feedback to the controller (2) that sets (modulates) the dosing rates of the pumps (3, 4).

Example 2B

In this example, conductivities measured by three conductivity probes (7, 9, 11) are used to modulate the dilution rate of the concentrated sodium chlorite and sulfuric acid solutions, i.e., via the first and second dosing pumps (3, 4), respectively, and the flow meter (6) is used for monitoring purposes. The flow rate of the dilution water through the system is 0.5 L/min. The first conductivity probe (7) records the dilution water conductivity, the second conductivity probe (9) records the conductivity downstream of injecting the concentrated sodium chlorite solution into the dilution water, the third conductivity probe (11) records the conductivity downstream of injecting the concentrated sulfuric acid solution into the dilution water containing the sodium chlorite. (See Table 2). As shown in Table 2, the first conductivity probe reading subtracted from the second conductivity probe reading (P2-P1) determines the conductivity of the diluted sodium chlorite solution and the second conductivity probe reading subtracted from the third conductivity probe reading (P3-P2) determines the conductivity of the diluted sulfuric acid solution (Table 2).

The determined conductivities of the diluted sodium chlorite solution (P2-P1) and the diluted sulfuric acid solution (P3-P2) are compared to the desired, known conductivities of the diluted sodium chlorite solution and the diluted sulfuric acid solution, respectively. The dilution (dosing) rates of the concentrated sodium chlorite solution and the concentrated sulfuric acid solution are then modulated so that the determined conductivities of the diluted sodium chlorite solution (P2-P1) and the diluted sulfuric acid solution (P3-P2) match the desired, known conductivities of the diluted sodium chlorite solution and the diluted sulfuric acid solution, respectively. The dilution water containing the sodium chlorite and sulfuric acid downstream of the third conductivity probe (i.e., the diluted, sodium chlorite and sulfuric acid solution) is continuously fed through a catalyst to generate aqueous chlorine dioxide, the concentration of which is measured using the Hach 2700 Spectrophotometer, and recorded (Table 2).

The values recorded in Table 2 show that conductivity modulation and sequential chlorine dioxide precursor injection effect consistent conductivities of the precursors, and consistent concentration of aqueous chlorine dioxide produced, over time.

Figure 5:
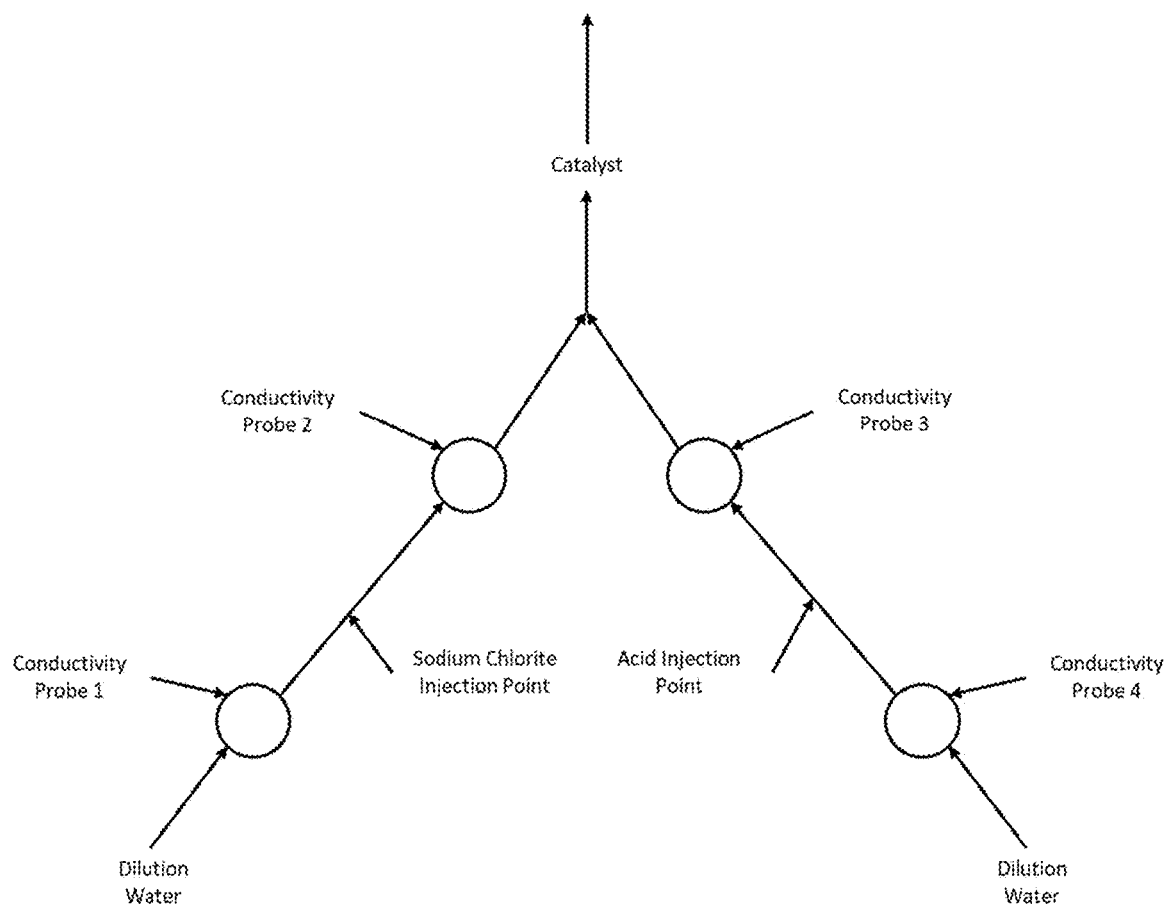
FIG. 5 is a flow diagram of a method for parallel dosing of chemical additives, and parallel measuring of conductivities, sequentially, in accordance with the invention described in this application, e.g., for generating aqueous chlorine dioxide, in accordance with Example 3 below.

Example 3: Aqueous Chlorine Dioxide Generation Using Separate Precursor Injection and Conductivity Modulated Dosing FIG. 5 shows a flow diagram using parallel dosing in accordance with the present invention. This system uses four conductivity probes, two injection points, two dosing pumps and two independent dilution water sources. Conductivity probe 1 (P1) and conductivity probe 3 (P3) are used to record the conductivity of the independent dilution water sources. The second conductivity probe (P2) records the conductivity after the sodium chlorite precursor is injected into the first dilution water source. The fourth conductivity probe (P4) records the conductivity after the sulfuric acid is injected into the second dilution water source. The first conductivity probe is subtracted from the second probe (P2-P1) to determine the conductivity of the diluted sodium chlorite precursor. The third conductivity probe is subtracted from the fourth conductivity probe (P4-P3) to determine the conductivity of the diluted sulfuric acid precursor. The determined diluted precursor solution conductivities are compared to the known conductivities of the diluted precursor solutions. The dilution (dosing) rates of the precursor solutions are then modulated by the controller to achieve—as the determined conductivity—the known conductivity of each diluted precursor solution. The two streams are then mixed at equal flow rates. This mixed solution is then continuously fed through a catalyst to generate aqueous chlorine dioxide. The chlorine dioxide concentration is then measured using a Hach 2700 Spectrophotometer and recorded. See Table 3. As shown in Table 3, by using conductivity modulation and separate precursor injection (dosing), the determined conductivities of the diluted precursor chemicals are consistent and the determined concentration of aqueous chlorine dioxide is consistent.

TABLE 1

Flow-Rate Controlled

| Time (min) | Flow (L/min) | P1 (µS) | P2 (µS) | P2 − P1 | P3 (µS) | P3 − P2 | ClO$_2$ Conc (mg/L) |
|---|---|---|---|---|---|---|---|
| 10 | 0.5 | 750 | 1,950 | 1,200 | 3,450 | 1,500 | 532 |
| 20 | 0.5 | 747 | 2,247 | 1,500 | 4,348 | 2,101 | 712 |
| 30 | 0.5 | 748 | 1,948 | 1,200 | 3,423 | 1,475 | 543 |
| 40 | 0.5 | 751 | 2,400 | 1,649 | 4,500 | 2,100 | 750 |
| 50 | 0.5 | 746 | 1,746 | 1,200 | 3,375 | 1,629 | 412 |

TABLE 2

Conductivity Controlled

| Time (min) | Flow (L/min) | P1 (µS) | P2 (µS) | P2 − P1 | P3 (µS) | P3 − P2 | ClO$_2$ Conc (mg/L) |
|---|---|---|---|---|---|---|---|
| 10 | 0.5 | 748 | 2,248 | 1,500 | 4,249 | 2,001 | 700 |
| 20 | 0.5 | 749 | 2,250 | 1,501 | 4,250 | 2,000 | 705 |
| 30 | 0.5 | 751 | 2,249 | 1,498 | 4,251 | 2,002 | 701 |
| 40 | 0.5 | 748 | 2,246 | 1,498 | 4,248 | 2,002 | 704 |
| 50 | 0.5 | 750 | 2,250 | 1,500 | 4,250 | 2,000 | 701 |

TABLE 3

Example 3

| Time (min) | P1 (µS) | P2 (µS) | P2 − P1 | P3 (µS) | P4 (µS) | P4 − P3 | ClO$_2$ Conc (mg/L) |
|---|---|---|---|---|---|---|---|
| 10 | 751 | 2,251 | 1,500 | 751 | 2,749 | 1,998 | 702 |
| 20 | 750 | 2,249 | 1,499 | 746 | 2,750 | 2,004 | 708 |
| 30 | 746 | 2,248 | 1,502 | 747 | 2,747 | 2,000 | 705 |
| 40 | 751 | 2,250 | 1,499 | 751 | 2,751 | 2,000 | 707 |
| 50 | 748 | 2,249 | 1,501 | 748 | 2,746 | 1,998 | 705 |

Example 4: Conductivity Control for Modulating the Dosing of Cooling Tower Treatment Chemicals A cooling tower recirculating water treatment system includes the serial dosing system exemplified in FIG. 3. FIG. 3 shows serial dosing system (1) fed with a single source of recirculating cooling tower water (5), three conductivity probes (7, 9, 11), two dosing pumps (3, 4), two injection points (8, 10), a flow meter (6), and a controller (2). Conductivities measured by the three conductivity probes (7, 9, 11) are used to modulate the feed (dosing) rates via the first and second dosing pumps (3, 4) of scaling inhibitor sulfuric acid and biocide chlorine, respectively, and the flow meter (6) measures the flow rate of cooling tower water fed (recirculated) into the system for monitoring purposes. Thus, first dosing pump (3) injects the scaling inhibitor (sulfuric acid) into the water stream flowing through conduit (14) at first injection point (8), and second dosing pump (4) injects the biocide (chlorine) into the water stream containing the inhibitor flowing through conduit (14) at second injection point (10); and, the first conductivity probe (7) measures water stream conductivity (P1), the second conductivity probe (9) measures conductivity of the water stream containing the inhibitor (P2), and the third conductivity probe (11) measures conductivity of the water stream containing the inhibitor and the biocide (P3). Controller (2) continuously compares the determined conductivities of the inhibitor (P2-P1) and the biocide (P3-P2) to the desired sulfuric acid conductivity of 750 uS (desired solution pH of 7.5) and the desired chlorine conductivity of 500 uS (desired solution concentration of 2 ppm chlorine), respectively, and signals dosing pumps (3, 4) to adjust up or down, as necessary, the amount of inhibitor and biocide injected into the system such that the determined conductivities of inhibitor and biocide match the known conductivities of inhibitor and biocide, respectively. Desired amounts of water treatment chemicals—in this case sulfuric acid (scaling inhibitor) and chlorine (biocide)—are, thereby, continuously maintained efficiently and effectively in a cooling tower recirculating water treatment system.

We claim:

1. A method of dosing a water stream with an aqueous chemical additive to produce a desired additive concentration in an aqueous chemical solution, the method comprising the steps of
   a) providing a stream of water at a flow rate and determining a conductivity of the water in the stream,
   b) dosing the water stream with an aqueous chemical additive at a dosing rate to obtain an aqueous chemical solution, determining a conductivity of the aqueous chemical solution, and subtracting the determined conductivity of the water stream from the determined conductivity of the aqueous chemical solution to obtain the conductivity of the aqueous chemical additive, wherein a known conductivity of the aqueous chemical additive yields a desired additive concentration in the aqueous chemical solution, and
   c) adjusting (i) the dosing rate of the aqueous chemical additive or (ii) the flow rate of the water stream to cause the determined conductivity of the aqueous chemical solution to approximate the known conductivity of the aqueous chemical additive, to thereby consistently obtain the desired additive concentration in the aqueous chemical solution.

2. The method of claim 1, wherein the aqueous chemical additive is a first aqueous chemical additive and the aqueous chemical solution is a first aqueous chemical solution, and the method comprises the additional steps of
   d) dosing the first aqueous chemical solution with a second aqueous chemical additive at a dosing rate to obtain a second aqueous chemical solution, determining a conductivity of the second aqueous chemical solution, and subtracting the determined conductivity of the first aqueous chemical solution from the determined conductivity of the second aqueous chemical solution to obtain the conductivity of the second aqueous chemical additive, wherein a known conductivity of the second aqueous chemical additive yields a desired second additive concentration in the second aqueous chemical solution, and
   e) adjusting the dosing rate of the second aqueous chemical additive to cause the determined conductivity of the second aqueous chemical solution to approximate the known conductivity of the second aqueous chemical additive, to thereby consistently obtain the desired second additive concentration in the second aqueous chemical solution.

3. The method of claim 2 further comprising the steps of
   f) dosing the second aqueous chemical solution in series with at least a third aqueous chemical additive at a dosing rate to obtain at least a third aqueous chemical solution, respectively, determining a conductivity at least the third aqueous chemical solution, respectively, and subtracting the immediately preceding aqueous chemical solution in series from the determined conductivity of the at least third aqueous chemical solution to obtain the conductivity of the at least third aqueous chemical additive, respectively, wherein a known conductivity of the at least third aqueous chemical additive yields a desired at least third additive concentration in the at least third aqueous chemical solution, respectively, and
   g) adjusting the dosing rate of the at least third aqueous chemical additive to cause the determined conductivity of the at least third aqueous chemical solution to approximate the known conductivity of the at least third aqueous chemical additive, respectively, to thereby consistently obtain the desired at least third additive concentration in the at least third aqueous chemical solution, respectively.

4. The method of claim 2, wherein the first aqueous chemical additive is sodium chlorite and the second aqueous chemical additive is concentrated sulfuric acid, and the second aqueous solution is passed through a catalyst to form chlorine dioxide.

5. The method of claim 1, wherein the aqueous chemical additive is a first aqueous chemical additive, the aqueous chemical solution is a first aqueous chemical solution, the stream of water is a first stream of water, and the method comprises the additional steps of,
   d) parallel to the providing step a), providing a second stream of water at a flow rate and determining a conductivity of the water in the second stream,
   e) parallel to the dosing step b), dosing the second water stream with a second aqueous chemical additive at a dosing rate to obtain a second aqueous chemical solution, determining a conductivity of the second aqueous chemical solution, and subtracting the determined conductivity of the second water stream from the determined conductivity of the second aqueous chemical solution to obtain the conductivity of the second aqueous chemical additive, wherein a known conductivity of the second aqueous chemical additive yields a desired additive concentration in the second aqueous chemical solution, and
   f) parallel to the adjusting step c), adjusting (i) the dosing rate of the second aqueous chemical additive or (ii) the flow rate of the second water stream to cause the determined conductivity of the second aqueous chemical solution to approximate the known conductivity of the second aqueous chemical additive, to thereby consistently obtain the desired second additive concentration in the second aqueous chemical solution.

6. The method of claim 5 further comprising the steps of
   g) parallel to the providing step a), providing at least a third stream of water at a flow rate and determining a conductivity of the water in the at least a third stream of water, respectively,
   h) parallel to the dosing step b), dosing the at least third water stream with an at least third aqueous chemical additive at a dosing rate to obtain an at least third aqueous chemical solution, respectively, determining a conductivity of the at least third aqueous chemical solution, and subtracting the determined conductivity of the at least third water stream from the determined conductivity of the at least third aqueous chemical solution to obtain the conductivity of the at least third aqueous chemical additive, respectively, wherein a known conductivity of the at least third aqueous chemical additive yields a desired at least third additive concentration in the at least third aqueous chemical solution, respectively, and
   i) parallel to the adjusting step c), adjusting (i) the dosing rate of the at least third aqueous chemical additive or (ii) the flow rate of the at least third water stream to cause the determined conductivity of the at least third aqueous chemical solution to approximate the known conductivity of the at least third aqueous chemical additive, respectively, to thereby consistently obtain the desired at least third additive concentration in the at least third aqueous chemical solution, respectively.

7. The method of claim 5, wherein the first aqueous chemical additive is sodium chlorite and the second aqueous chemical additive is concentrated sulfuric acid, and further comprising the steps of, following the parallel adjusting steps c) and f), g) combining the first aqueous chemical solution with the second aqueous chemical solution and h) passing the combined first and second aqueous chemical solutions through a catalyst to form chlorine dioxide.

8. An apparatus for dosing a water stream with an aqueous chemical additive to produce a desired additive concentration in an aqueous chemical solution, the apparatus comprising a) piping having an inlet for introducing a water stream and an outlet for exiting an aqueous chemical solution;

b) a flow regulator in the piping to control the flow rate of the water stream into the piping;

c) a first conductivity probe in the piping to measure a conductivity of the water stream entering the piping inlet;

d) a source of an aqueous chemical additive and a first pump for dosing the aqueous chemical additive into the water stream downstream from the first conductivity probe to produce an aqueous chemical solution, wherein a known conductivity for the aqueous chemical additive yields a desired additive concentration in the aqueous chemical solution;

e) a second conductivity probe in the piping to measure a conductivity of the aqueous chemical solution; and f) a controller configured to determine a conductivity of the aqueous chemical additive by subtracting the determined conductivity of the water stream from the determined conductivity of the aqueous chemical solution, the controller also configured to (i) adjust the dosing rate of the aqueous chemical additive by adjusting the first pump or (ii) adjust the flow rate of the water stream by adjusting the flow regulator, to cause the determined conductivity of the aqueous chemical solution to approximate the known conductivity of the aqueous chemical additive, to thereby consistently obtain the desired additive concentration in the aqueous chemical solution.

9. The apparatus of claim 8, wherein the aqueous chemical additive is a first aqueous chemical additive and the aqueous chemical solution is a first aqueous chemical solution, and the apparatus further includes g) a source of a second aqueous chemical additive and a second pump for dosing the second aqueous chemical additive into the first aqueous chemical solution downstream from the second conductivity probe to produce a second aqueous chemical solution, wherein a known conductivity of the second aqueous chemical additive yields a desired additive concentration in the second aqueous chemical solution; and h) a third conductivity probe in the piping to measure a conductivity of the second aqueous chemical solution;

wherein the controller is further configured to determine a conductivity of the second aqueous chemical additive by subtracting the determined conductivity of the first aqueous chemical solution from the determined conductivity of the second aqueous chemical solution, the controller also configured to adjust the dosing rate of the second aqueous chemical additive by adjusting the second pump to cause the determined conductivity of the second aqueous chemical solution to approximate the known conductivity of the second aqueous chemical additive, to thereby consistently obtain the desired additive concentration in the second aqueous chemical solution.

10. The apparatus of claim 9, wherein the first aqueous chemical additive is sodium chlorite and the second aqueous chemical additive is concentrated sulfuric acid, and the apparatus further includes a catalyst to convert the second aqueous chemical solution to chlorine dioxide.

11. The apparatus of claim 8, wherein the aqueous chemical additive is a first aqueous chemical additive, the aqueous chemical solution is a first aqueous chemical solution, the piping is a first piping, the water stream is a first water stream, the flow regulator is a first flow regulator, and the apparatus further includes g) a second piping having an inlet for introducing a second water stream and an outlet for exiting a second aqueous chemical solution;

h) a second flow regulator in the piping to control the flow rate of the second water stream into the piping;

i) a third conductivity probe in the piping to measure a conductivity of the second water stream entering the piping inlet;

j) a source of a second aqueous chemical additive and a second pump for dosing the second aqueous chemical additive into the second water stream downstream from the third conductivity probe to produce a second aqueous chemical solution, wherein a known conductivity for the second aqueous chemical additive yields a desired additive concentration in the second aqueous chemical solution; and k) a fourth conductivity probe in the second piping to measure a conductivity of the second aqueous chemical solution;

wherein the controller is further configured to determine a conductivity of the second aqueous chemical additive by subtracting the determined conductivity of the second water stream from the determined conductivity of the second aqueous chemical solution, and to adjust the dosing rate of the second aqueous chemical additive by adjusting the second pump to cause the determined conductivity of the second aqueous chemical solution to approximate the known conductivity of the second aqueous chemical additive, to thereby consistently obtain the desired additive concentration in the second aqueous chemical solution.

12. The apparatus of claim 11, wherein the first aqueous chemical additive is sodium chlorite and the second aqueous chemical additive is concentrated sulfuric acid, and the apparatus further includes l) a third piping having an inlet connecting to the first piping outlet and the second piping outlet for combining the first aqueous chemical solution with the second aqueous chemical solution, and m) a catalyst in fluid communication with the third piping to convert the combined first and second aqueous chemical solutions to chlorine dioxide.

13. The apparatus of claim 11, wherein the first aqueous chemical additive is sodium chlorite and the second aqueous chemical additive is concentrated sulfuric acid, and the apparatus further includes l) a third piping having an inlet connecting to the first piping outlet and the second piping outlet for combining the first aqueous chemical solution with the second aqueous chemical solution, and m) a catalyst in fluid communication with the third piping to convert the combined first and second aqueous chemical solutions to chlorine dioxide.

14. An apparatus for dosing a water stream with an aqueous chemical additive to produce a desired additive concentration in an aqueous chemical solution, the apparatus comprising a) piping having an inlet for introducing a water stream and an outlet for exiting an aqueous chemical solution;
b) a water metering device in the piping to control the flow rate of the water stream into the piping;
c) a first conductivity probe in the piping to measure a conductivity of the water stream entering the piping inlet;
d) a source of an aqueous chemical additive and an eductor for dosing the aqueous chemical additive into the water stream downstream from the first conductivity probe to produce an aqueous chemical solution, wherein a known conductivity for the aqueous chemical additive yields a desired additive concentration in the aqueous chemical solution;
e) a second conductivity probe in the piping to measure a conductivity of the aqueous chemical solution; and
f) a controller configured to determine a conductivity of the aqueous chemical additive by subtracting the determined conductivity of the water stream from the determined conductivity of the aqueous chemical solution, the controller also configured to adjust the flow rate of the water stream by adjusting the water metering device, to cause the determined conductivity of the aqueous chemical solution to approximate the known conductivity of the aqueous chemical additive, to thereby consistently obtain the desired additive concentration in the aqueous chemical solution.

15. The apparatus of claim 14, wherein the aqueous chemical additive is a first aqueous chemical additive, the aqueous chemical solution is a first aqueous chemical solution, the piping is a first piping, the water stream is a first water stream, the water metering device is a first water metering device, and the apparatus further includes g) a second piping having an inlet for introducing a second water stream and an outlet for exiting a second aqueous chemical solution;
h) a second water metering device in the piping to control the flow rate of the second water stream into the piping;
i) a third conductivity probe in the piping to measure a conductivity of the second water stream entering the piping inlet;
j) a source of a second aqueous chemical reagent and a second eductor for dosing the second aqueous chemical reagent into the second water stream downstream from the third conductivity probe to produce a second aqueous chemical solution, wherein a known conductivity for the second aqueous chemical additive yields a desired additive concentration in the second aqueous chemical solution; and
k) a fourth conductivity probe in the second piping to measure a conductivity of the second aqueous chemical solution; wherein the controller is further configured to determine a conductivity of the second aqueous chemical additive by subtracting the determined conductivity of the second water stream from the determined conductivity of the second aqueous chemical solution, and to adjust the dosing rate of the second aqueous chemical additive by adjusting the second water metering device, to cause the determined conductivity of the aqueous chemical solution to approximate the known conductivity of the aqueous chemical additive, to thereby consistently obtain the desired additive concentration in the aqueous chemical solution.

* * * * *